(12) United States Patent
Sapp et al.

(10) Patent No.: US 11,405,548 B1
(45) Date of Patent: Aug. 2, 2022

(54) CAMERA SYSTEM FOR A REMOTELY OPERATED VEHICLE

(71) Applicant: VRTUL, Inc., St. Petersburg, FL (US)

(72) Inventors: Casey Sapp, St. Petersburg, FL (US); Jeremy Childress, Salem, OR (US)

(73) Assignee: VRTUL, Inc., St. Petersburg, FL (US)

( * ) Notice: Subject to any disclaimer, the term of this patent is extended or adjusted under 35 U.S.C. 154(b) by 0 days.

(21) Appl. No.: 17/226,930

(22) Filed: Apr. 9, 2021

Related U.S. Application Data

(60) Provisional application No. 63/011,117, filed on Apr. 16, 2020, provisional application No. 63/034,533, filed on Jun. 4, 2020.

(51) Int. Cl.
| | | |
|---|---|---|
| *H04N 7/18* | (2006.01) | |
| *H04N 5/232* | (2006.01) | |
| *H04N 5/225* | (2006.01) | |
| *B60R 1/00* | (2022.01) | |

(52) U.S. Cl.
CPC ......... *H04N 5/23238* (2013.01); *B60R 1/002* (2013.01); *H04N 5/2252* (2013.01); *H04N 5/23229* (2013.01); *H04N 5/232939* (2018.08); *B60R 2300/10* (2013.01)

(58) Field of Classification Search
CPC ......... H04N 5/23238; H04N 5/232939; H04N 5/2252; H04N 5/23229; B60R 1/002; B60R 2300/10
See application file for complete search history.

(56) References Cited

U.S. PATENT DOCUMENTS

| | | | |
|---|---|---|---|
| 2016/0114887 A1* | 4/2016 | Zhou | H04N 5/23238 348/148 |
| 2016/0198074 A1* | 7/2016 | Boyle | G06T 1/0007 348/81 |
| 2022/0004188 A1* | 1/2022 | Ryan | G05D 1/0016 |

FOREIGN PATENT DOCUMENTS

WO  WO-2018104780 A2 *  6/2018  ........ G05D 1/0692

* cited by examiner

*Primary Examiner* — Patrick E Demosky
(74) *Attorney, Agent, or Firm* — Clause Eight; Michael Catania

(57) ABSTRACT

A remotely operated vehicle (ROV) comprising a body with an external surface and a payload exoskeleton attached to the external surface is disclosed herein. The payload skid comprises synchronized cameras configured to generate a real-time 360 degree panoramic video stream.

14 Claims, 11 Drawing Sheets

CAMERA SYSTEM FOR A REMOTELY OPERATED VEHICLE

CROSS REFERENCES TO RELATED APPLICATIONS

The Present Application claims priority to U.S. Provisional Patent Application No. 63/011,117 filed on Apr. 16, 2020, and U.S. Provisional Patent Application No. 63/034,533 filed on Jun. 4, 2020, each of which is incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to a camera system for a Remotely Operated Vehicle (ROV).

Description of the Related Art

ROV pilots are in need of visualization tools to increase navigation capabilities and spatial awareness. Precision tasks utilizing ROV manipulator arms are also difficult to accomplish without 1:1 scale visuals and 3D depth (particularly in the front of the vehicle where the manipulator arms are). Viewing a real-time panoramic stream into a VR/AR headset is the ideal scenario for remotely achieving complex underwater tasks.

General definitions used herein include the following:

Virtual Reality ("VR") is generally defined as an artificially created environment generated with a computer, and experienced by the sensory stimulation (visually, audibly, . . . etc.) of a user.

Head Mounted Display ("HMD") is a visual display mounted to a user's head.

Augmented Reality ("AR") is generally defined as an environment that combines visual images (graphical, symbolic, alphnumerics, . . . etc.) with a user's real view.

The prior art provided integrated 360 spherical cameras on the front or top of ROV's, which created an obstructed view.

BRIEF SUMMARY OF THE INVENTION

The present invention is a Remotely Operated Vehicle (ROV) mount and/or payload exoskeleton, which displays a real-time 360 panoramic video stream.

The present invention provides underwater 360 degree live streaming camera technology paired with VR headsets to enable unprecedented spatial awareness for ROV operators.

One aspect of the present invention is a remotely operated vehicle (ROV) comprising a body with an external surface and a payload exoskeleton attached to the external surface. The payload skid comprises synchronized cameras configured to generate a real-time 360 degree panoramic video stream.

Another aspect of the present invention is a multi-camera apparatus for a ROV. The apparatus comprises a payload exoskeleton for attachment to an external surface of an ROV and synchronized cameras attached to the payload skid. The synchronized cameras are configured to generate a real-time 360 degree panoramic video stream.

Yet another aspect of the present invention is a camera system for a ROV. The system preferably comprises a ROV, a payload exoskeleton with synchronized cameras, a display apparatus and a communication means between the plurality of synchronized cameras and the display apparatus. The payload exoskeleton is attached to the external surface of the ROV. The synchronized cameras are configured to generate a real-time 360 degree panoramic video stream.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
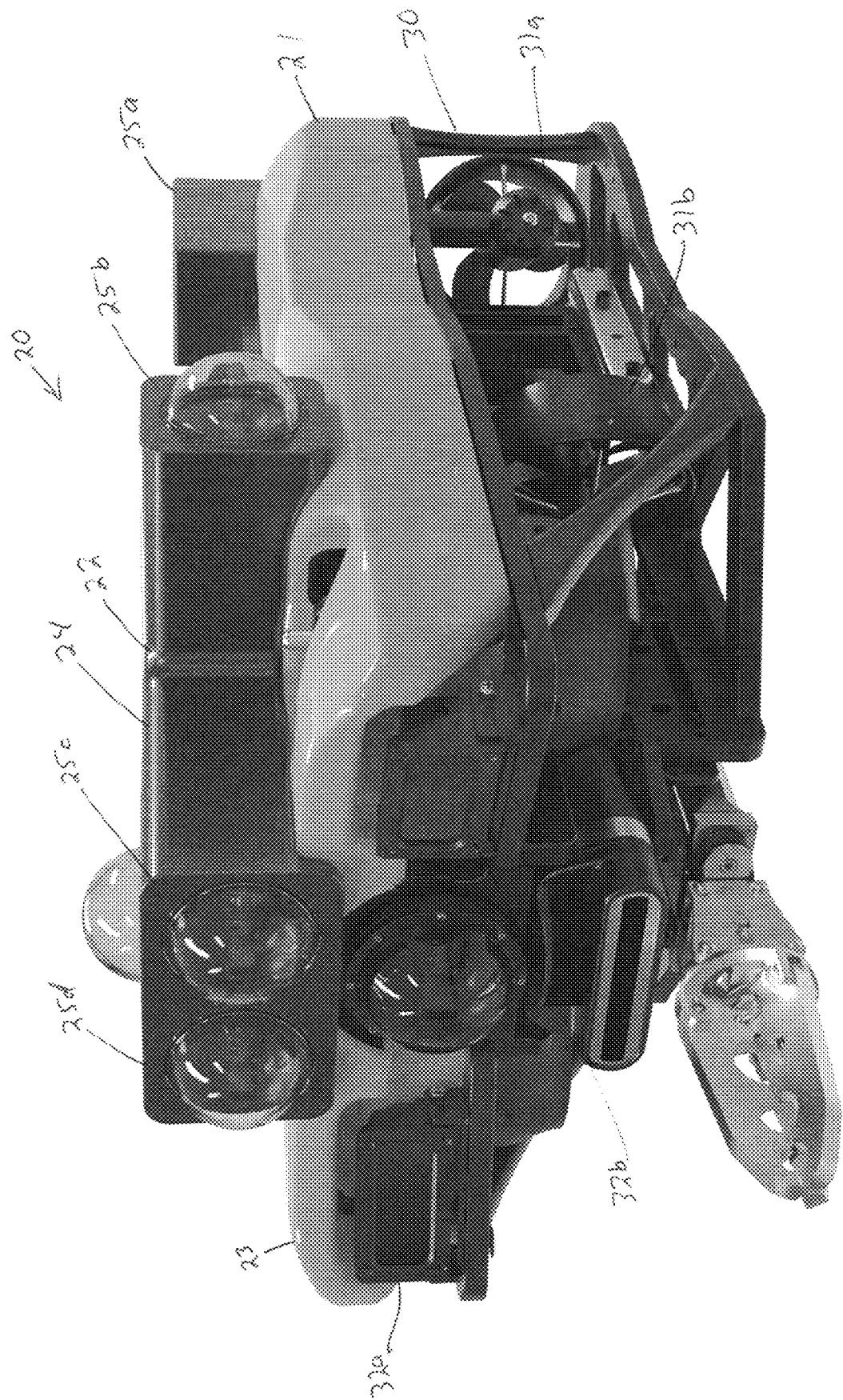
FIG. 1 is a top perspective view of a ROV with a multi-camera apparatus attached thereto.
Figure 2:
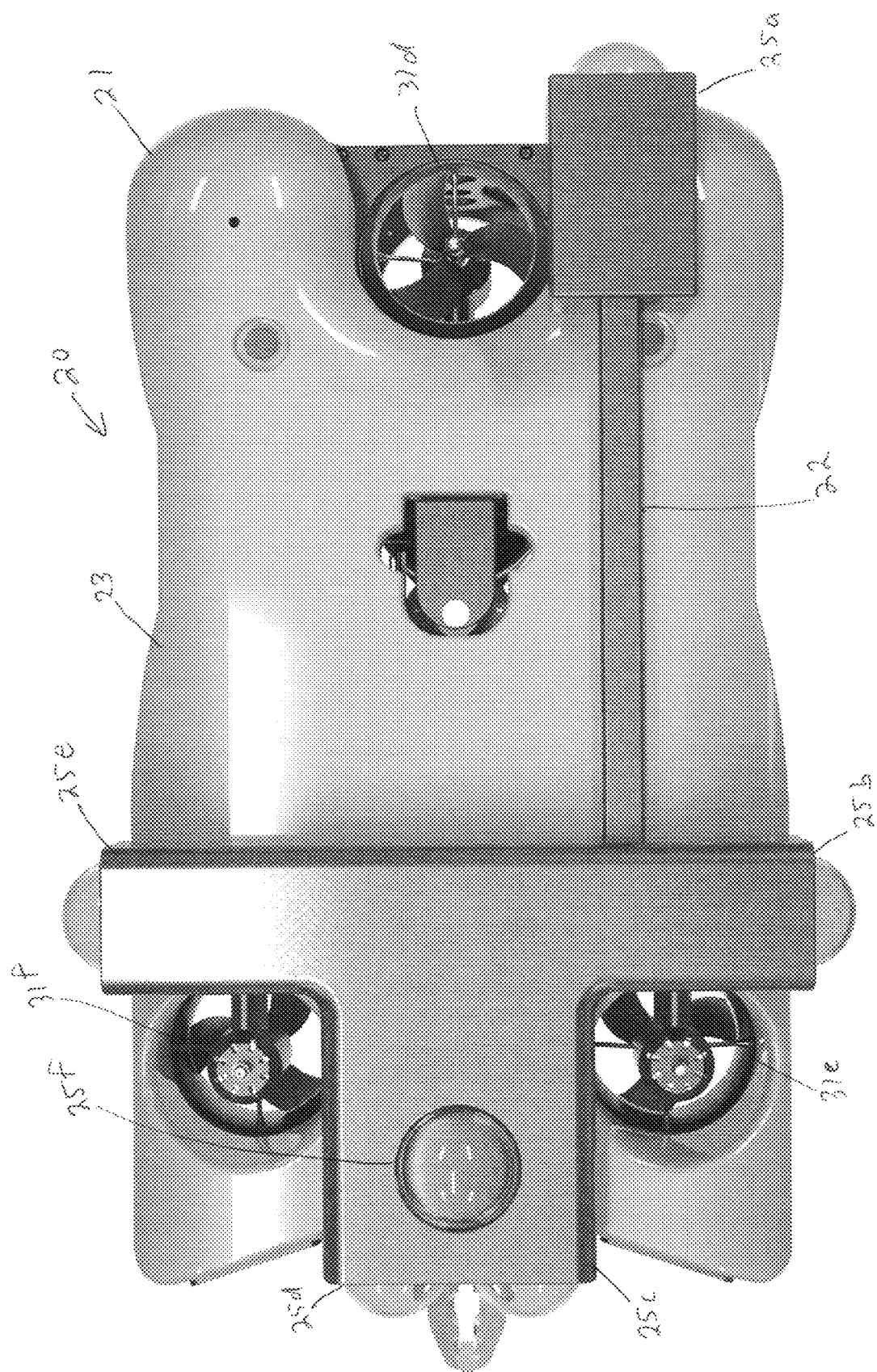
FIG. 2 is a top plan view of a ROV with a multi-camera apparatus attached thereto.
Figure 3:
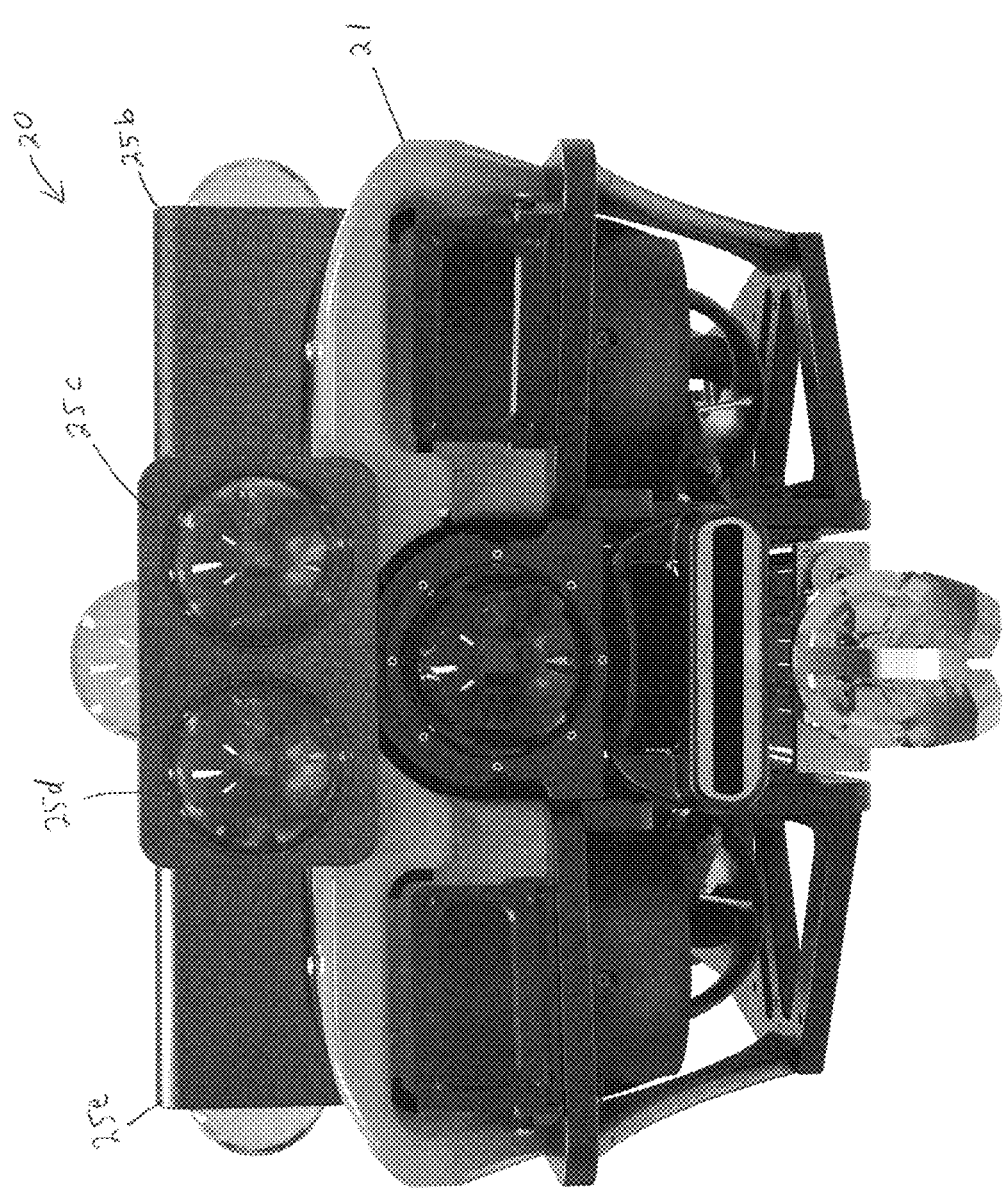
FIG. 3 is a front elevation view of a ROV with a multi-camera apparatus attached thereto.
Figure 4:
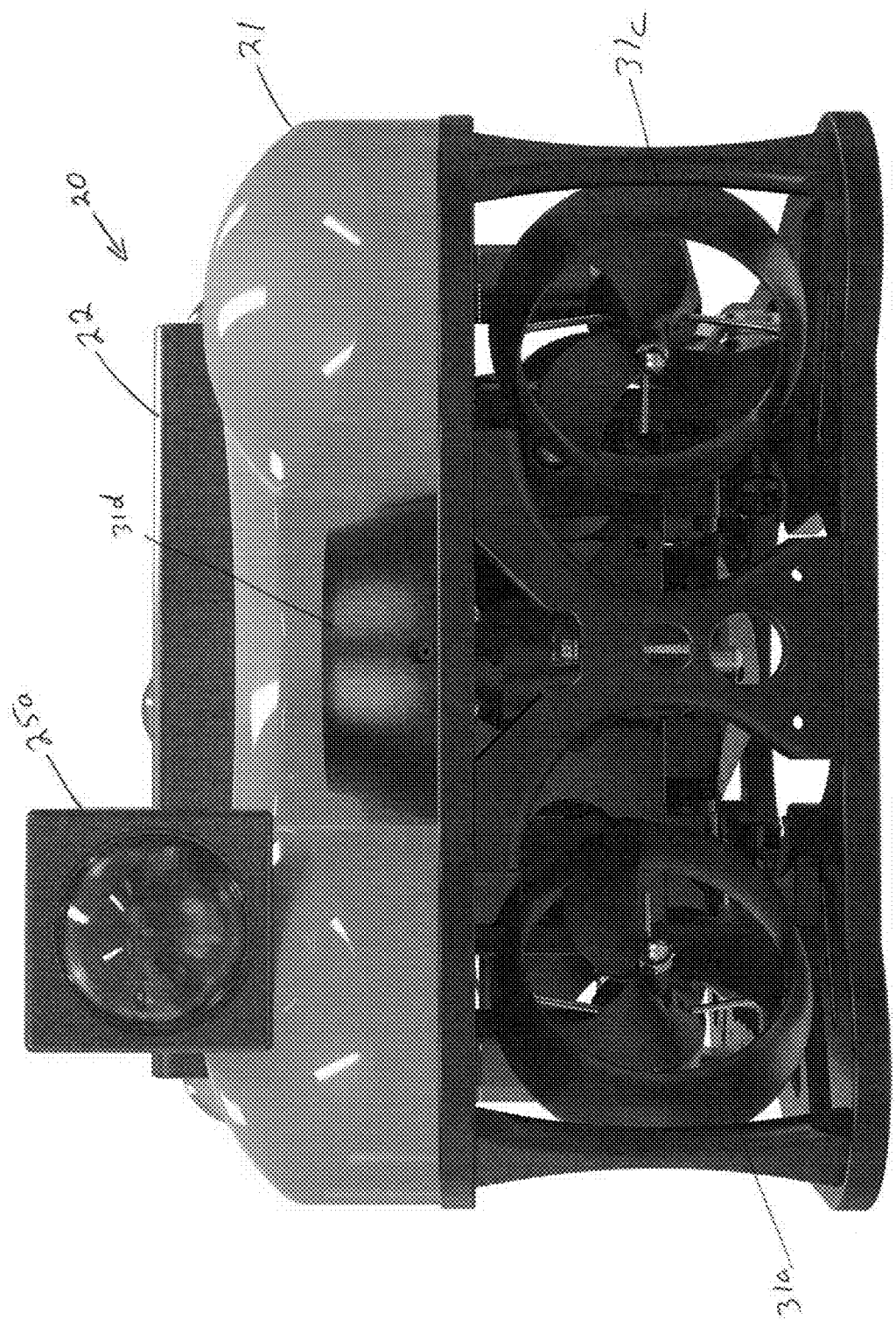
FIG. 4 is a rear elevation view of a ROV with a multi-camera apparatus attached thereto.
Figure 5:
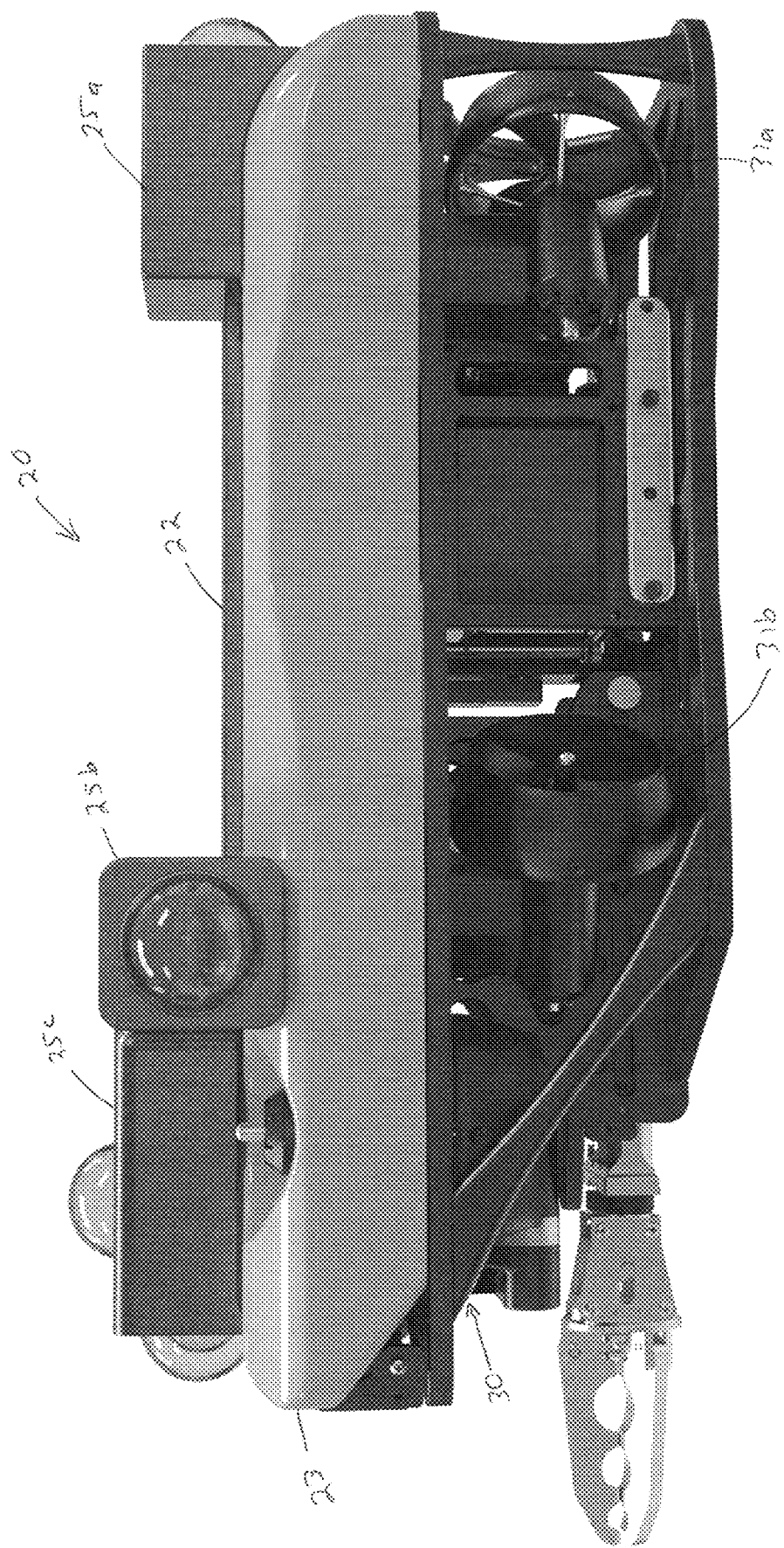
FIG. 5 is a side elevation view of a ROV with a multi-camera apparatus attached thereto.

FIGS. 1-5 illustrate a ROV 20 with a multi-camera apparatus 22 attached thereto. The ROV 20 preferably comprises a bottom section 30, a housing 23, multiple propulsion components 31a-31f and lighting devices 32a and 32b. The multi-camera apparatus 22 preferably comprises a frame 24 attached to a top surface of the housing 23. Alternatively, the frame 24 is attached to the bottom section 30. The multi-camera apparatus 22 preferably comprises a first synchronized camera 25a, a second synchronized camera 25b, a third synchronized camera 25c, a fourth synchronized camera 25d, a fifth synchronized camera 25e and a sixth synchronized camera 25f. The multi-camera apparatus 22 preferably provides a 360 degree panoramic video stream about the ROV 20.

Each of the synchronized cameras 25a-25f is preferably either a camera, a camera board or a board level camera. Each of the synchronized cameras 25a-25f preferably comprises a sensor, lens, a frame synchronization, and an image processing power. In a preferred embodiment of the multi-camera apparatus 22, each side has at least a single camera. In an alternative embodiment of the multi-camera apparatus 22, each side has at least two cameras.

Figure 6:
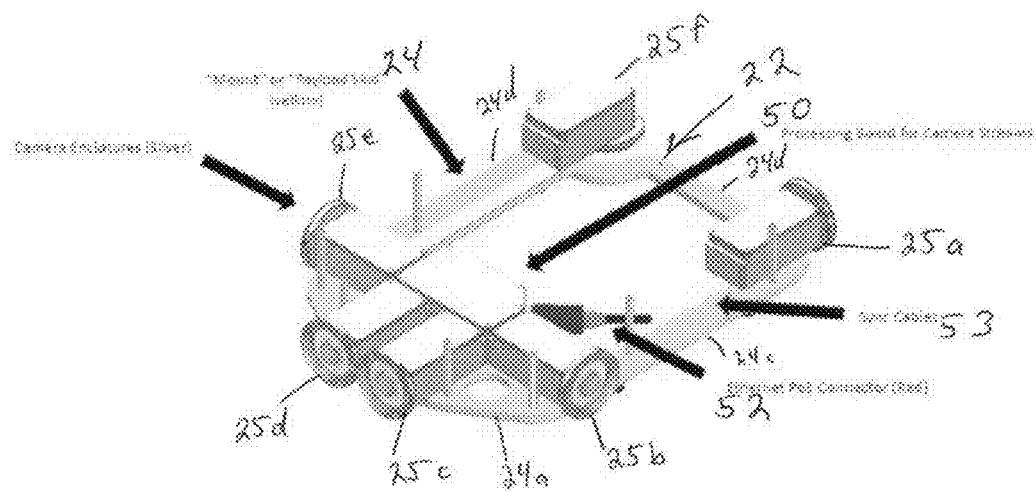
FIG. 6 is a top perspective view of a multi-camera apparatus.

FIG. 6 is a top perspective view of a multi-camera apparatus 22. The multi-camera apparatus 22 preferably comprises a frame 24, a first synchronized camera 25a, a second synchronized camera 25b, a third synchronized camera 25c, a fourth synchronized camera 25d, a fifth synchronized camera 25e and a sixth synchronized camera 25f. The multi-camera apparatus 22 also comprises a processing board 50 for processing the data from the synchronized cameras via cables 53. An Ethernet cable 52 is preferable connected to the processing board 50. The frame 24 preferably comprises a front member 24a, a rear member 24b, a first side member 24c and a second side member 24d. In one embodiment, the second camera 25b, the third camera 25c, the fourth camera 25d and the fifth camera 25e are attached to the front member 24a, the first camera 25a is attached to the rear member 24b, and the sixth camera 25f is attached to the second side member 24d.

Figure 7:
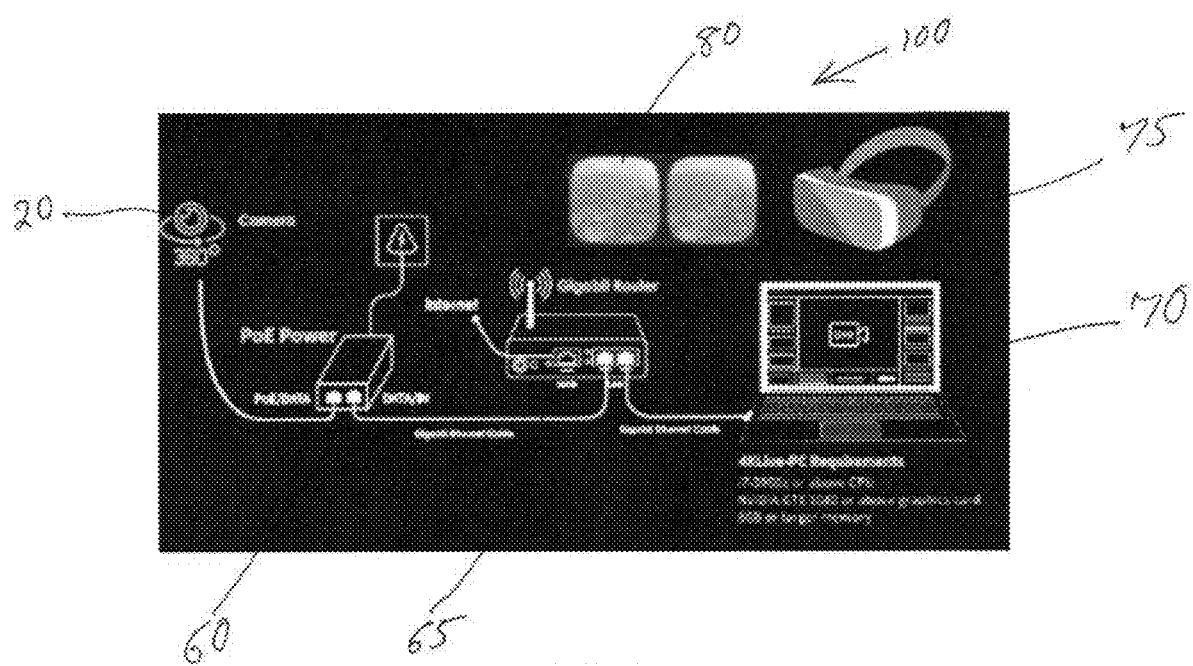
FIG. 7 is a block diagram of a system for a ROV with a multi-camera apparatus attached thereto.

FIG. 7 is a block diagram of a system 100 for a ROV 20 with a multi-camera apparatus attached thereto. The system 100 preferably comprises the ROV 20, a computer/server 70 and a display apparatus 75. The display apparatus 75 is a display monitor or a virtual reality (VR) or augmented reality (AR) headset providing a display 80 for a viewer. The camera feeds are preferably stitched and then live-streamed in 180 3D or 360 2D to a VR headset.

Figure 8:
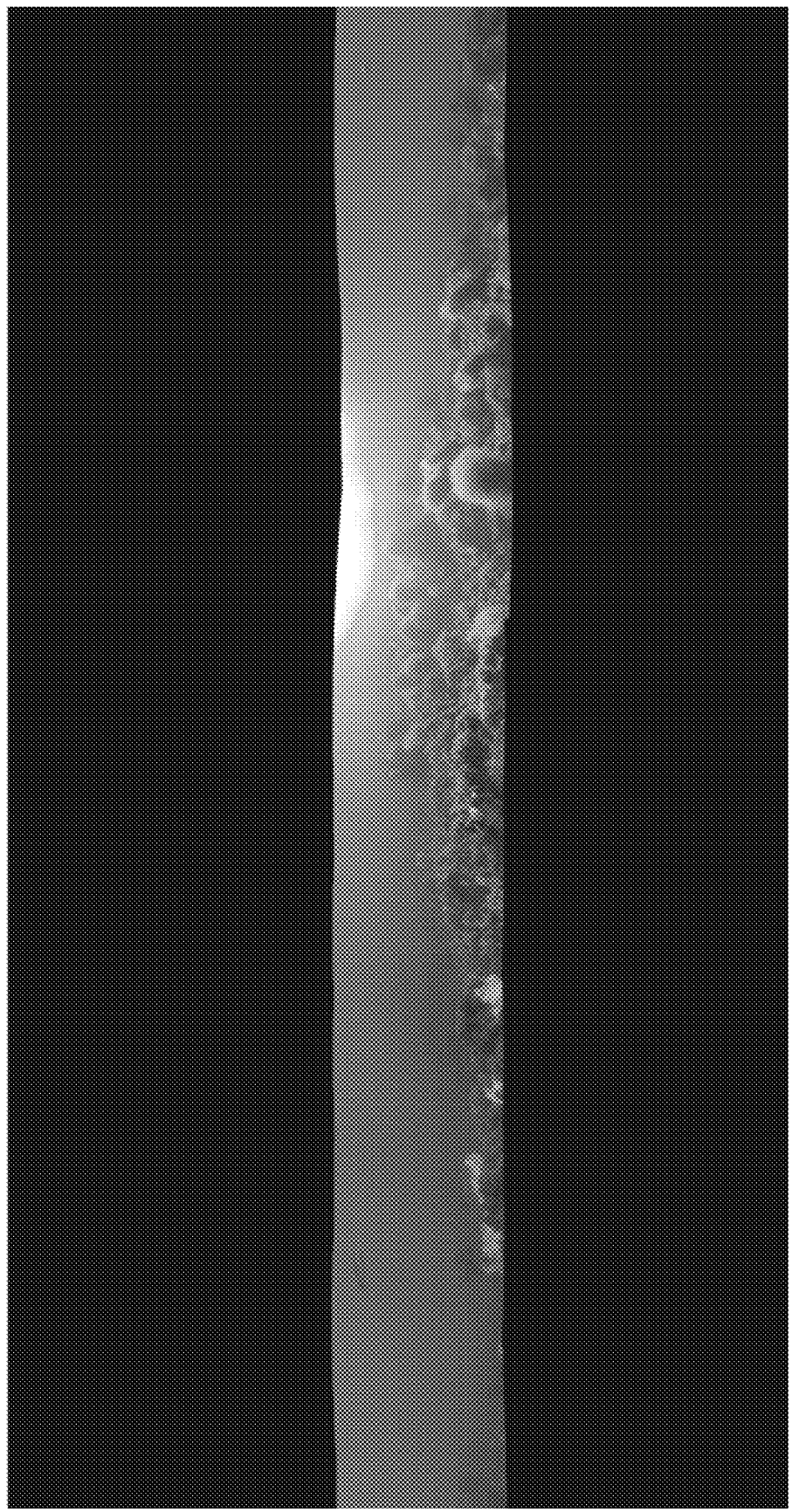
FIG. 8 is a 360 degree panoramic view about the ROV.

FIG. 8 illustrates a 360 degree panoramic view 800 about the ROV taken with plurality synchronized cameras.

Figure 9:
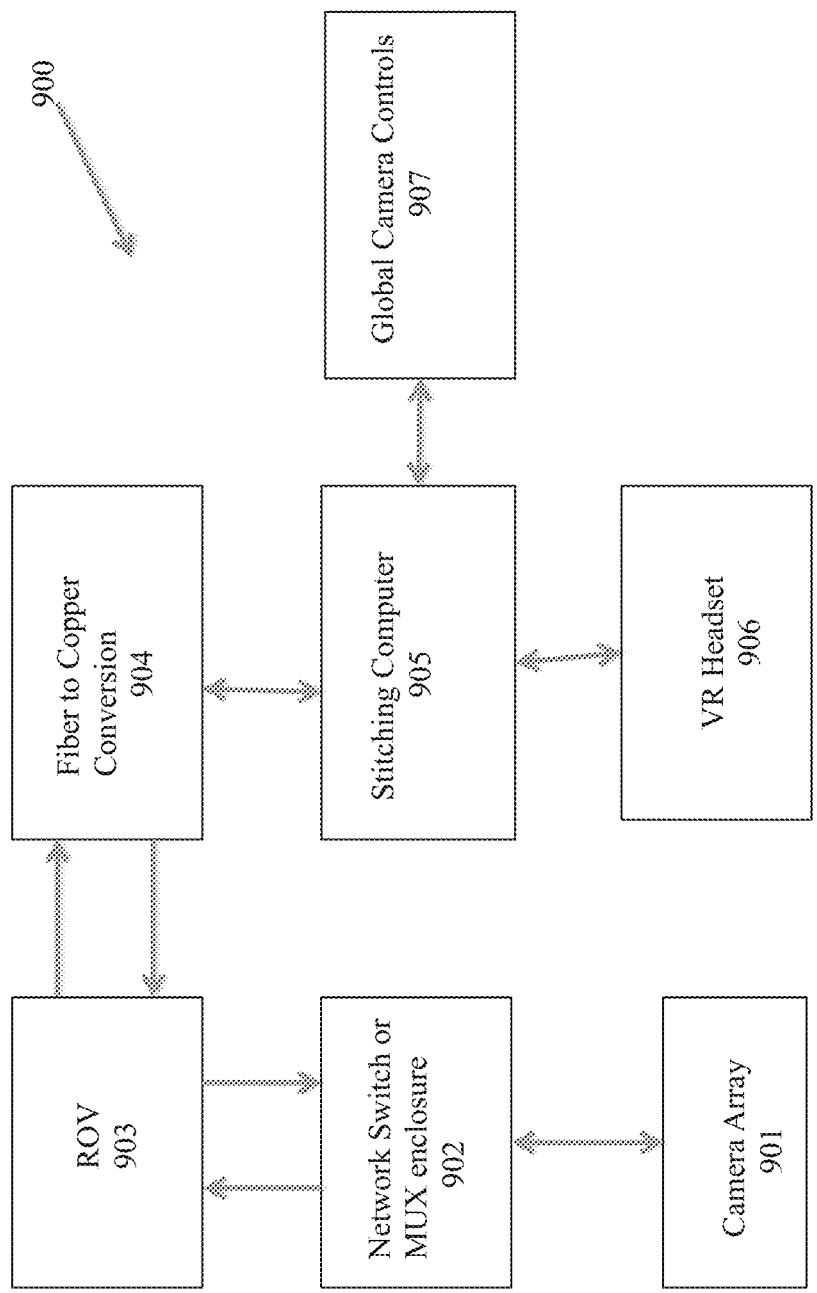
FIG. 9 is a flow chart of a ROV VR signal diagram for a ROV with a multi-camera apparatus attached thereto.

FIG. 9 is a flow chart of a ROV VR signal diagram 900 for a ROV with a multi-camera apparatus attached thereto. A camera array 901 communicates with a network switch (or MUX enclosure) 902, which communicates over fiber with the ROV 903. The ROV communicates through a vehicle umbilical cord with a fiber to copper conversion 904. The fiber to copper conversion communicates with the stitching computer 905 which communicates with the VR headset 906 and the global camera control 907.

Figure 10:
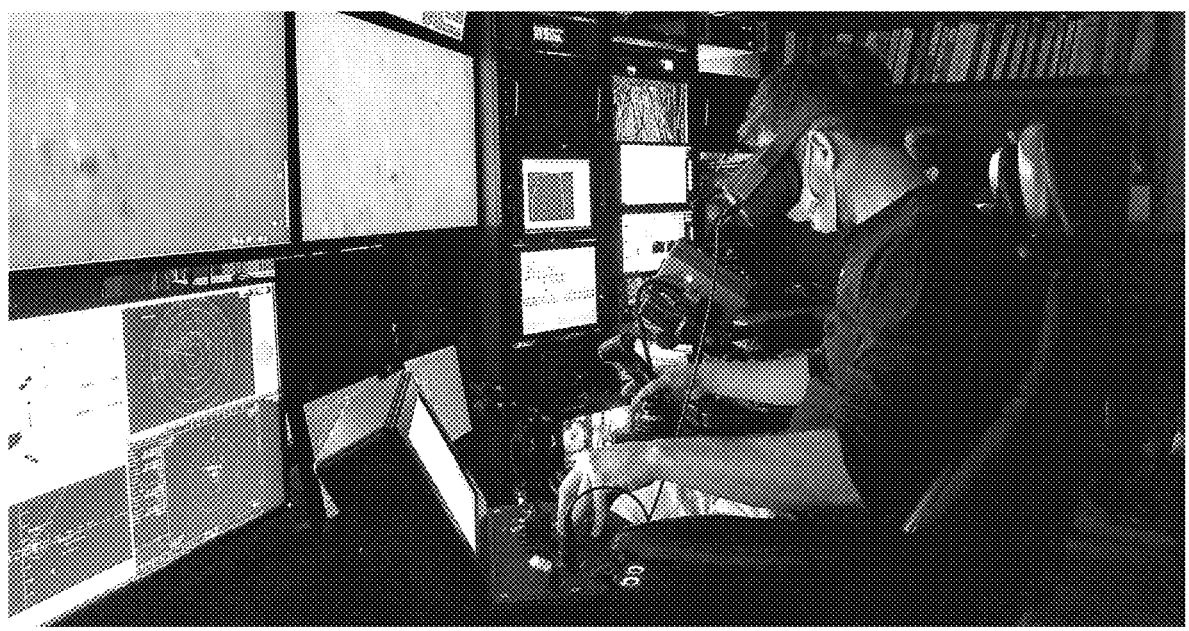
FIG. 10 is an illustration of a control room utilizing a system for a ROV with a multi-camera apparatus attached thereto.

FIG. 10 is an illustration of a user in a control room utilizing a system for a ROV with a multi-camera apparatus attached thereto. The control room has a display, which displays the real-time 360 degree panoramic streaming view 800 about the ROV taken with plurality synchronized cameras. The user is wearing a VR or AR headset and operating the controls for the ROV. The control room preferably includes a photorealistic synthetic simulation environment built in UNREAL ENGINE for training ROV pilots how to perform tasks with the ROV VR controls.

The multi-camera apparatus 22 or "payload exoskeleton" is preferably attached to an external surface of the housing 23 or the bottom section 30. The system 100, by utilizing preferably four to ten synchronized cameras, generates a 360 2D and/or 3D stitched panoramic video stream for real-time viewing. In underwater embodiments, the 4K-8K underwater live stream is able to viewed remotely via an Ethernet or fiber cable connection on a display monitor or directly into a virtual reality (VR) or Augmented Reality (AR) headset.

The synchronized cameras 25a-25f are configured to generate a real-time 360 degree panoramic video stream.

The placement of the multi-camera apparatus 22 plus the configuration of multiple synchronized live streaming cameras 25a-25f achieve a real-time panoramic stitch. As used herein, a camera is a camera, camera board, board level camera or the like, and a camera preferably comprises a sensor, lens, frame synchronization, and image processing power.

The present invention provides spatial awareness, navigational tools, and underwater 3D depth for ROV pilots. The present invention provides real-time remote viewing, 3D depth, 1:1 object visualization, and a stitched panoramic video stream fed to a display or VR/AR headset. In one embodiment, this is achieved through a very specific placement of the synchronized cameras 25a-25f on the multi-camera apparatus 22 on a bottom section 30 of the ROV 20. The 360 degree panoramic video stream is preferably a non-full spherical video lacking an image in a nadir region since a camera is not directed upward from a nadir region.

The specific problem resolved by the present invention is spatial awareness, navigational clarity on all sides of the vehicle, with 1:1 scale object visualization in real-time.

A commercial ROV such as a VideoRay Defender ROV, BlueROV2 by Blue Robotics, or any enterprise ready commercial ROV may be utilized with the multi-camera apparatus 22.

The present invention preferably utilizes Kandao Obsidian camera boards.

The present invention preferably utilizes Voysys for panoramic stitching and livestreaming.

The frame 24 preferably utilizes aluminum or carbon fiber, and acetyl plastic camera enclosures to house the camera boards and keep them water sealed.

The configuration (geometry of the lens placement) of the cameras 25a-25f provides enough image overlap to enable a panoramic video stream with both 2D and 3D depth. The distances for each of the synchronized cameras 25a-25f is dependent on the dimensions of the ROV body Generally, there is a camera 25 positioned in 90 degree quadrants, representing each side of the ROV.

In a preferred embodiment, the present invention is designed to meet weight thresholds, depth rating (e.g, 500 M, 1000 M, 6000 M), and form factor for underwater operations.

The display apparatus 75 is preferably a display monitor or a virtual reality (VR) or augmented reality (AR) headset.

The real-time 360 degree panoramic video stream is in 3-dimension or 2-dimension.

An alternative embodiment is a remotely operated vehicle (ROV) comprising a body with an external surface and a payload exoskeleton attached to the body. The payload exoskeleton comprises synchronized cameras configured to generate a real-time 360 degree panoramic video stream.

The ROV 20 further comprises an Ethernet or fiber cable connection to a display apparatus.

The ROV 20 further comprises a processing board for the synchronized cameras.

The ROV 20 is preferably a submersible vehicle, however other ROVs are within the scope of the invention such as an aerial drone or a remote car.

For the digital stitching process of the camera views, there are mainstream motion based algorithms which blend the images between different cameras to create a single equirectangular video. A preferred motion based algorithm is the NVIDIAVRWorks process, while another is the WebGL process.

A key aspect of the invention is that while the prior art has previously created 360 video streams on an ROV (wherein the camera is on top or bottom and the view includes the ROV), no one has successfully done it around a perimeter of a ROV body. The present invention allows the ROV pilot to see on all sides of the vehicle and above (excludes the zenith). Additionally, preferably, the front side of the ROV captures a 3D view at all times. The other sides and above may capture either 2D or 3D depending on the number of cameras, but the front is always 3D. The cameras are preferably at 90 degree angles to each other. Alternatively, the present invention allows the ROV pilot to see on all sides of the vehicle and underneath (excludes the zenith). Additionally, preferably, the front side of the ROV captures a 3D view at all times. The other sides and below may capture either 2D or 3D depending on the number of cameras, but the front is preferably always 3D.

The display device is preferably selected from the group comprising a desktop computer, a laptop computer, a tablet computer, a mobile phone, an AR headset, and a virtual reality (VR) headset.

The user interface elements include the capacity viewer and mode changer.

The human eye's performance is generally as follow: 150 pixels per degree (foveal vision); Field of view Horizontal: 145 degrees per eye Vertical 135 degrees; Processing rate: 30 frames per second Stereoscopic vision Color depth: 8-bit, 10-bit, 12-bit, assuming full resolution across entire FOV (33 megapixels for practical focus area;s) Human vision, full sphere: 50 Gbits/sec. A typical HD video is 4 Mbits/sec and the present invention is preferably 1,000,000 Mbits/sec.

The present invention preferably provides a low latency VR video stream (less than 70 milli-seconds), real-time multi-sensor data visualizations, hands free gesture controls, 180 3D, 360 2D or 360 3D video, VR livestitching, and is compatible with Ethernet and Fiber.

Every ROV preferably has at least one processor board on the vehicle, but not every camera module needs an enclosure with a board in it. The board can be attached via cables. The designs attached have a board and camera module in them, and other embodiments have an enclosure with only a camera module. Other designs can be flexible using these enclosures mounted on various types of frames. Every ROV VR system preferably has at least one camera (sometimes two to create a stereo pair) on every side of the vehicle.

Figure 11:
FIG. 11 is an isolated view of a stereo camera.

There are preferably two cameras on every side of the body of the ROV. Preferably there are two facing front cameras, two side cameras, one rear camera and one upward (or downward) camera. Alternatively, there are stereo pairs of cameras (3D reconstruction with assisted stereo) in each position, for a total of eight to ten cameras. Wherever there is a set of stereo cameras on the vehicle a pattern project is included in order to create depth maps. As shown in FIG. 11, each stereo camera 25 preferably has a length of approximately 8.5 inches, a width of approximately 5.5 inches, and a height of approximately 3 inches.

Figure 12:
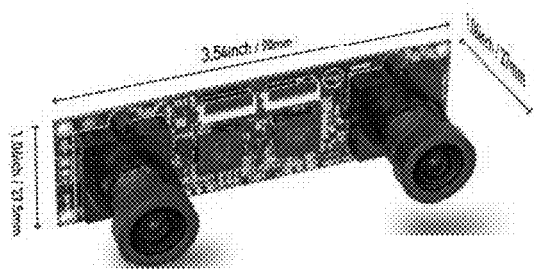
FIG. 12 is an isolated view of a stereo camera module.

In a preferred embodiment, the apparatus has a SONY IMX415 stereo camera module (as shown in FIG. 12) which has a resolution of 4000 per eye, with a refresh rate of 70-90 Hertz, a stacked, back illuminated CMOS image sensor, 10-bit, NVIDIA XAVIER AGX SOM board, a latency Ethernet of 50 ms-80 ms, a power supply of 19 volts, with a maximum of 30 Watts, a video format of H.264 H.265, a FOV of 180×140 (the lenses are exchangeable using a standard M12 mount), a high signal to noise ratio, a full synchronization and gunlock of one or multiple camera modules for multi-angle camera views, and optional a real-time object detection and distance measurement capabilities.

A preferred enclosure (housing) for the camera is a 180 ROV VR camera enclosure, which has a dome material of BK7 glass or sapphire, a length of approximately 9 inches, a diameter of approximately 5 inches, a mass in an aluminum version of approximately 10.5 pounds, and a mass in a titanium version of approximately 16.5 pounds. In another embodiment, with a 300 meter depth rating, the enclosure has a dome material of acrylic, dimensions of approximately 7 inches in length, 5 inches in width, and 3 inches in height, and a mass of approximately 3 pounds. In another embodiment, with a 300 meter depth rating, the enclosure has a dome material of acrylic, dimensions of approximately 3 inches in length, 7 inches in width, and 5 inches in height, and a mass of approximately 3 pounds.

The VR headset preferably has an intuitive software interface, 8K image and true colors, 7680×2160 per eye, 180 degree field of view, an embedded leap motion system and gesture control, and Foveated rendering.

The ROV preferably includes a microprocessor, an input device, a memory, a machine learning unit, a tensor processing unit (TPU), a transceiver, a comparator, and an image capturing device. The microprocessor is coupled to the input device, the memory, the machine learning unit, the TPU, the transceiver, the comparator, and the image capture device. The transceiver may connect to the network through the input terminal and the output terminal.

A microprocessor preferably includes suitable logic, circuitry, and/or interfaces that are operable to execute one or more instructions stored in the memory to perform predetermined operations. The microprocessor may be implemented using one or more microprocessor technologies known in the art. Examples of the microprocessor include, but are not limited to, an x86 microprocessor, an ARM microprocessor, a reduced instruction set computer (RISC) microprocessor, a complex instruction set computer (CISC) microprocessor, an application-specific integrated circuit (ASIC), or any other microprocessor.

The memory stores a set of instructions and data. Some of the commonly known memory implementations include, but are not limited to, a random access memory (RAM), a read-only memory (ROM), a hard disk drive (HDD), a secure digital (SD) card, and a secure Micro-SD card. Further, the memory includes the one or more instructions that are executable by the microprocessor to perform specific operations. It will be apparent to a person with ordinary skill in the art that the one or more instructions stored in the memory enable the hardware of the system to perform the predetermined operations.

A transceiver transmits and receives messages and data to or from various components of the system environment (e.g., the vehicle and the user computing device) over the network. In some embodiments, the transceiver is coupled to the input terminal and the output terminal through which the transceiver may receive and transmit data/messages, respectively. Examples of the input terminal and the output terminal include, but are not limited to, an antenna, an Ethernet port, a USB port, or any other port that can be configured to receive and transmit data. The transceiver transmits and receives data/messages in accordance with the various communication protocols—such as TCP/IP, UDP, and 2G, 3G, or 4G communication protocols—through the input terminal and the output terminal.

Wearable glasses worn by a technician may be integrated with AR technology, light field technology, and/or VR positioning technology. It should be noted that the wearable glasses may include some other technologies as well, without departing from the scope of the disclosure. The wearable glasses may include a frame and one or more lenses. The one or more lenses may be detachably mounted in the frame. The frame may be made up of a material such as a plastic or metal. Further, the wearable glasses may have an integrated battery and a central processing unit (CPU), in accordance with at least one embodiment. The battery may be disposed within the frame of the wearable glasses. It should be noted that the battery may be disposed at various positions on the frame. For example, the battery may be disposed at an end of the frame of the wearable glasses. In one case, the battery may be a rechargeable battery.

A computer system utilized with the ROV and apparatus may comprise a computer, an input device, a display unit, and the Internet. The computer may further comprise a microprocessor. The microprocessor may be connected to a communication bus. The computer may also include a memory. The memory may be random-access memory or read-only memory. The computer system may further comprise a storage device, which may be a hard disk drive or a removable storage device such as a floppy disk drive, an optical disk drive, an SD card, flash storage, or the like. The storage device may also be a means for loading computer programs or other instructions into the computer system. The computer system may also include a communication unit. The communication unit may allow the computer to connect to other computer systems and the Internet through an input/output (I/O) interface, allowing the transfer and reception of data to and from other systems. The communication unit may include a modem, an Ethernet card, or similar devices that enable the computer system to connect to networks such as LANs, MANs, WANs, and the Internet. The computer system facilitates input from a user through input devices accessible to the system through the I/O interface.

To process input data, the computer system may execute a set of instructions stored in one or more storage elements. The storage element(s) may also hold other data or information, as desired. Each storage element may be in the form of an information source or a physical memory element present in or connected to the processing machine.

The programmable or computer-readable instructions may include various commands that instruct the processing machine to perform specific tasks, such as steps that constitute the method of the disclosure. The systems and methods described can also be implemented using software alone, hardware alone, or a varying combination of the two. The disclosure is independent of the programming language and the operating system used by the computers. The instructions for the disclosure may be written in any programming language, including, but not limited to, assembly language or machine instructions, C, C++, Objective-C, Java, Swift, Python, and JavaScript. Further, software may be in the form of a collection of separate programs, a program module containing a larger program, or a portion of a program module, as discussed in the foregoing description. The software may also include modular programming in the form of object-oriented programming. The processing of input data by the processing machine may be in response to user commands, the results of previous processing, or a request made by another processing machine. The methods and systems of the disclosure may also be implemented using various operating systems and platforms, including, but not limited to, Unix, Linux, BSD, DOS, Windows, Android, iOS, Symbian, a real-time operating system, and a purpose-built operating system. The methods and systems of the disclosure may be implemented using no operating system as well. The programmable instructions may be stored and transmitted on a computer-readable medium. The disclosure may also be embodied in a computer program product comprising a computer-readable medium with any product capable of implementing the above methods and systems or the numerous possible variations thereof.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A remotely operated vehicle (ROV) for underwater live video streaming, the ROV comprising:
    a body with an external surface;
    a payload exoskeleton attached to the external surface of the body, the payload exoskeleton comprising a frame and a plurality of synchronized cameras attached to the frame, wherein the plurality of cameras comprises a first camera, a second camera, a third camera, a fourth camera, a fifth camera and a sixth camera, wherein each of the plurality of synchronized cameras is configured to generate a 4K live underwater video stream;
    a cable in communication with the plurality of synchronized cameras and configured for connection to a display apparatus;
    wherein the frame of the payload exoskeleton comprises a front member, a rear member, a first side member and a second side member;
    wherein the first camera, the second camera and the third camera are attached to the front member, the fourth camera is attached to the rear member, the fifth camera is attached to the first side member, and the sixth camera is attached to the second side member; wherein the first camera and the second camera each have a front field of view, the third camera has an upward field of view, the fourth camera has a rear field of view, the fifth camera has a first side field of view, and the sixth camera has a second side field of view, wherein the fifth camera is at an angle of ninety degrees relative to the first camera, the sixth camera is at an angle of ninety degrees relative to the second camera, and third camera is at an angle of ninety degrees relative to the first camera, and the fourth camera is an angle of ninety degrees relative to the fifth camera; and
    wherein the plurality of synchronized cameras are configured to generate a real-time underwater 360 degree panoramic video stream about the ROV or a real-time underwater 180 degree video stream.

2. The ROV according to claim 1 wherein the cable connection is an Ethernet or fiber cable connection to a display apparatus.

3. The ROV according to claim 2 wherein the display apparatus is a display monitor or a virtual reality (VR) or augmented reality (AR) headset.

4. The ROV according to claim 1 wherein the real-time 360 degree panoramic video stream is in 3-dimension or 2-dimension and the 360 degree panoramic video stream is a non-full spherical video lacking an image in a nadir region.

5. The ROV according to claim 1 wherein each of the plurality of synchronized cameras is a camera, a camera board or a board level camera.

6. The ROV according to claim 1 wherein each of the plurality of synchronized cameras comprises a sensor, lens, frame synchronization, and image processing power.

7. The ROV according to claim 1 further comprising a processing board for the plurality of cameras.

8. A multiple cameras apparatus for a remotely operated vehicle (ROV) for underwater live video streaming, the apparatus comprising:

a payload exoskeleton for attachment to an external surface of an ROV;

a plurality of synchronized cameras attached to the payload exoskeleton, wherein the plurality of cameras comprises a first camera, a second camera, a third camera, a fourth camera, a fifth camera and a sixth camera, wherein each of the plurality of synchronized cameras is configured to generate a 4K live underwater video stream;

wherein the frame of the payload exoskeleton comprises a front member, a rear member, a first side member and a second side member;

wherein the first camera, the second camera and the third camera are attached to the front member, the fourth camera is attached to the rear member, the fifth camera is attached to the first side member, and the sixth camera is attached to the second side member; wherein the first camera and the second camera each have a front field of view, the third camera has an upward field of view, the fourth camera has a rear field of view, the fifth camera has a first side field of view, and the sixth camera has a second side field of view; and wherein the plurality of synchronized cameras are configured to generate a real-time 360 degree panoramic video stream.

9. The apparatus according to claim 8 further comprising an Ethernet or fiber cable connection to a display apparatus.

10. The apparatus according to claim 9 wherein the display apparatus is a display monitor or a virtual reality (VR) or augmented reality (AR) headset.

11. The apparatus according to claim 8 wherein the real-time 360 degree panoramic video stream is in 3-dimension or 2-dimension and the 360 degree panoramic video stream is a non-full spherical video lacking an image in a nadir region.

12. The apparatus according to claim 8 wherein each of the plurality of synchronized cameras is a camera, a camera board or a board level camera.

13. The apparatus according to claim 8 wherein each of the plurality of synchronized cameras comprises a sensor, lens, frame synchronization, and image processing power.

14. A camera system for a ROV for underwater live video streaming, the system comprising:

a ROV with a body with an external surface;

a payload exoskeleton attached to the external surface of the body, the payload exoskeleton comprising a frame and a plurality of synchronized cameras, wherein the plurality of synchronized cameras comprises a first camera, a second camera, a third camera, a fourth camera, a fifth camera and a sixth camera, wherein each of the plurality of synchronized cameras is configured to generate a 4K live underwater video stream, wherein the frame of the payload exoskeleton comprises a front member, a rear member, a first side member and a second side member, wherein the first camera, the second camera and the third camera are attached to the front member, the fourth camera is attached to the rear member, the fifth camera is attached to the first side member, and the sixth camera is attached to the second side member; wherein the first camera and the second camera each have a front field of view, the third camera has an upward field of view, the fourth camera has a rear field of view, the fifth camera has a first side field of view, and the sixth camera has a second side field of view, wherein the fifth camera is at an angle of ninety degrees relative to the first camera, the sixth camera is at an angle of ninety degrees relative to the second camera, and third camera is at an angle of ninety degrees relative to the first camera, and the fourth camera is an angle of ninety degrees relative to the fifth camera;

a display apparatus;

a fiber cable connection between the plurality of synchronized cameras and the display apparatus;

wherein a mainstream motion based algorithm is utilized to blend the 4K live underwater video stream from each of the plurality of synchronized cameras to create a single equi-rectangular video to generate a real-time 360 degree panoramic underwater video stream.

* * * * *